(12) United States Patent
Prölss

(10) Patent No.: US 11,802,619 B1
(45) Date of Patent: Oct. 31, 2023

(54) PLANETARY GEAR ARRANGEMENT FOR CARRYING LOAD AND ELLIPTICAL PIN FOR SUPPORTING GEAR

(71) Applicant: Rolls-Royce Deutschland Ltd & Co KG, Blankenfelde-Mahlow (DE)

(72) Inventor: Maximilian Prölss, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 0 days.

(21) Appl. No.: 17/888,822

(22) Filed: Aug. 16, 2022

(51) Int. Cl.
| | |
|---|---|
| *F16H 57/08* | (2006.01) |
| *F16H 57/04* | (2010.01) |
| *F02C 7/36* | (2006.01) |
| *F16H 1/28* | (2006.01) |
| *F02C 3/107* | (2006.01) |
| *F02C 3/10* | (2006.01) |
| *F02C 3/113* | (2006.01) |
| *F02C 9/56* | (2006.01) |
| *F16H 25/24* | (2006.01) |
| *F16H 27/06* | (2006.01) |
| *F16H 35/10* | (2006.01) |

(52) U.S. Cl.
CPC .............. *F16H 57/08* (2013.01); *F02C 7/36* (2013.01); *F16H 1/28* (2013.01); *F16H 57/043* (2013.01); *F16H 57/0467* (2013.01); *F02C 3/10* (2013.01); *F02C 3/107* (2013.01); *F02C 3/113* (2013.01); *F02C 9/56* (2013.01); *F05D 2240/60* (2013.01); *F05D 2260/40* (2013.01); *F05D 2260/4031* (2013.01); *F05D 2260/40311* (2013.01); *F05D 2260/53* (2013.01); *F05D 2260/56* (2013.01); *F16H 1/2827* (2013.01); *F16H 25/2409* (2013.01); *F16H 27/06* (2013.01); *F16H 57/0482* (2013.01); *F16H 2035/103* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,844,708 A | * | 7/1989 | Lopez | F01C 1/077 418/36 |
| 8,657,714 B1 | * | 2/2014 | Ghanime | F16C 33/1065 384/380 |
| 2012/0277056 A1 | * | 11/2012 | Erno | F03D 80/70 29/893 |

(Continued)

*Primary Examiner* — Binh Q Tran
(74) *Attorney, Agent, or Firm* — SHUTTLEWORTH & INGERSOLL, PLC; Timothy J. Klima

(57) ABSTRACT

A planetary gear arrangement for carrying load including a sun gear configured to rotate about an axis of rotation of the planetary gear and defines an axial direction of the planetary gear, a plurality of planet gears driven by the sun gear, a ring gear engaged with the plurality of planet gears and a plurality of elliptical pins, each having a longitudinal axis and an outside contact surface, wherein the plurality of elliptical pins are arranged in the plurality of planet gears forming a convergent gap and a divergent gap therebetween, and wherein plurality of elliptical pins are configured to conform to elliptically deformed plurality of planet gears when subjected to the load and form an effective area therebetween to bear the load. An elliptical pin for supporting a gear and a gas turbine engine.

13 Claims, 3 Drawing Sheets

(56) References Cited

U.S. PATENT DOCUMENTS

| | | | |
|---|---|---|---|
| 2013/0051984 A1* | 2/2013 | McCune | F02C 7/36 |
| | | | 415/122.1 |
| 2015/0030492 A1* | 1/2015 | Montie | F01C 21/106 |
| | | | 418/260 |
| 2017/0227093 A1* | 8/2017 | Matsumoto | F16H 57/12 |
| 2018/0322239 A1* | 11/2018 | Aboumrad | G01M 13/021 |
| 2020/0217506 A1* | 7/2020 | Ichihashi | F23R 3/06 |

* cited by examiner

PLANETARY GEAR ARRANGEMENT FOR CARRYING LOAD AND ELLIPTICAL PIN FOR SUPPORTING GEAR

TECHNICAL FIELD

The present disclosure relates generally to planetary gear arrangement; more specifically, the present disclosure relates to planetary gear arrangement for carrying load. Moreover, the present disclosure relates to an elliptical pin for supporting gear. Furthermore, the present disclosure also relates to a gas turbine engine for an aircraft.

BACKGROUND

Contemporary jet engines include a planetary gear arrangement. Generally, the planetary gear arrangement is used to regulate the speed of the fan of the jet engine. Notably, the planetary gear arrangement having a sun gear, planet gears, ring gear, carrier and cylindrical planet pins arranged on the planet gears to connect the planet gears with the carrier.

However, during operation, the planetary gear arrangement is exposed to centrifugal force and torque obtained from the jet engines that deform the planet gears which leads to a change in a thickness of a lubricating film in a slide bearing between the cylindrical planet pins and the planet gears, and thereby compromises the functionality of the slide bearing.

In particular, the cylindrical planet pin having its ends affixed in a carrier and the planet gears, respectively, is subjected to bending as a result of the occurring forces, due to which the thickness of the lubricating film increases in the center region of the cylindrical planet pins and is reduced at the ends of the cylindrical planet pins, resulting in an increased lubricating film pressure at the ends of the cylindrical planet pins. In addition, the reduced lubricating film at the ends may lead to metal-to-metal contact between the cylindrical planet pins and the planet gears. As a result, the cylindrical planet pin undergoes higher loads and thereby affecting the load capacity. Moreover, the load and wear can be reduced by using an improved stiffness of the cylindrical planet pin. However, the improved stiffness is achieved by increasing the wall thickness of the cylindrical planet pin that results in increased weight consequently adding weight to the jet engines.

Therefore, to ameliorate the technical problems encountered with known planetary gear arrangement, there exists a need to provide an improved planetary gear arrangement that is more effective when in operation.

SUMMARY

The present disclosure seeks to provide an improved planetary gear arrangement for carrying load. The present disclosure also seeks to provide an improved elliptical pin for supporting a gear. The present disclosure also seeks to provide an improved gas turbine engine for an aircraft. The present disclosure seeks to provide a solution to the existing problem by increasing the effective area by introducing the elliptical pin that can be used to compensate the external loads and to increase the load capability of the planetary gear arrangement, An aim of the present disclosure is to provide a solution that overcomes, at least partially, the aforementioned problems encountered in prior art, and to provide a planetary gear arrangement which improves the load carrying capability, is more efficient and provides a higher structural rigidity.

In a first aspect, the present disclosure provides a planetary gear arrangement for carrying load comprising:
- a sun gear configured to rotate about an axis of rotation of the planetary gear arrangement and defines an axial direction of the planetary gear arrangement;
- a plurality of planet gears driven by the sun gear;
- a ring gear engaged with the plurality of planet gears; and
- a plurality of elliptical pins, each having a longitudinal axis and an outside contact surface, wherein the plurality of elliptical pins are arranged in the plurality of planet gears forming a convergent gap and a divergent gap therebetween, and wherein the plurality of elliptical pins are configured to conform to elliptically deformed plurality of planet gears when subjected to the load and form an effective area therebetween to bear the load.

Optionally, a minimum gap, between the plurality of elliptical pins conforming to the elliptically deformed plurality of planet gears, defines a minimum film thickness.

More optionally, the plurality of elliptical pins having a major semi-axis and a minor semi-axis ratio, wherein the ratio of the major semi-axis to the minor semi-axis is in a range of 3 to 4.

Optionally, the ratio of the major semi-axis to the minor semi-axis is 3 or 3.2 or 3.4 or 3.6 or 3.8 or 4 or up to 3, or up to 3.2 or up to 3.4 or up to 3.6 or up to 3.8 or up to 4.

Optionally, the plurality of elliptical pins include a crowning on the outside contact surface.

In a second aspect, the present disclosure provides an elliptical pin for supporting a gear, the elliptical pin comprising:
- a longitudinal axis and
- an outside contact surface,
wherein the elliptical pin is arranged in the gear to form a convergent gap and a divergent gap therebetween, and wherein the elliptical pin is configured to conform to elliptically deformed gear when subjected to a load and form an effective area therebetween to bear the load.

Optionally, the elliptical pin includes a crowning on the outside contact surface.

In a third aspect, the present disclosure provides a gas turbine engine for an aircraft, comprising:
- an engine core having a turbine, a compressor and a turbine shaft connecting the turbine to the compressor;
- a fan positioned upstream of the engine core, the fan having a plurality of fan blades and a fan shaft; and
- a planetary gear according to the first aspect, for receiving input from the turbine shaft and to provide output to the fan shaft Embodiments of the present disclosure substantially eliminate or at least partially address the aforementioned problems in the prior art, and provides a planetary gear arrangement having a plurality of elliptical pins to carry load and provides structural rigidity.

Additional aspects, advantages, features and objects of the present disclosure become apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with a planetary gear arrangement for carrying load. The embodiments of the present disclosure are also concerned with an elliptical pin for supporting a gear. The embodiments of the present disclosure are also concerned with a gas turbine engine for an aircraft.

The planetary gear arrangement, having the plurality of elliptical pins, performs a plurality of functions: connects the centers of the plurality of planet gears and rotates the plurality of planet gears to have a meshing without any slip. The plurality of elliptical pins provides an increase in the minimum film thickness and increases the efficiency of the gas turbine engine. Moreover, the design of the plurality of the elliptical pin also enables significant increase of load capability but increasing the convergent gap height. The elliptical design of the plurality of the elliptical pins increases the effective area that can be used to compensate for the external loads and to increase the load capability of the planetary gear arrangement.

Figure 1:
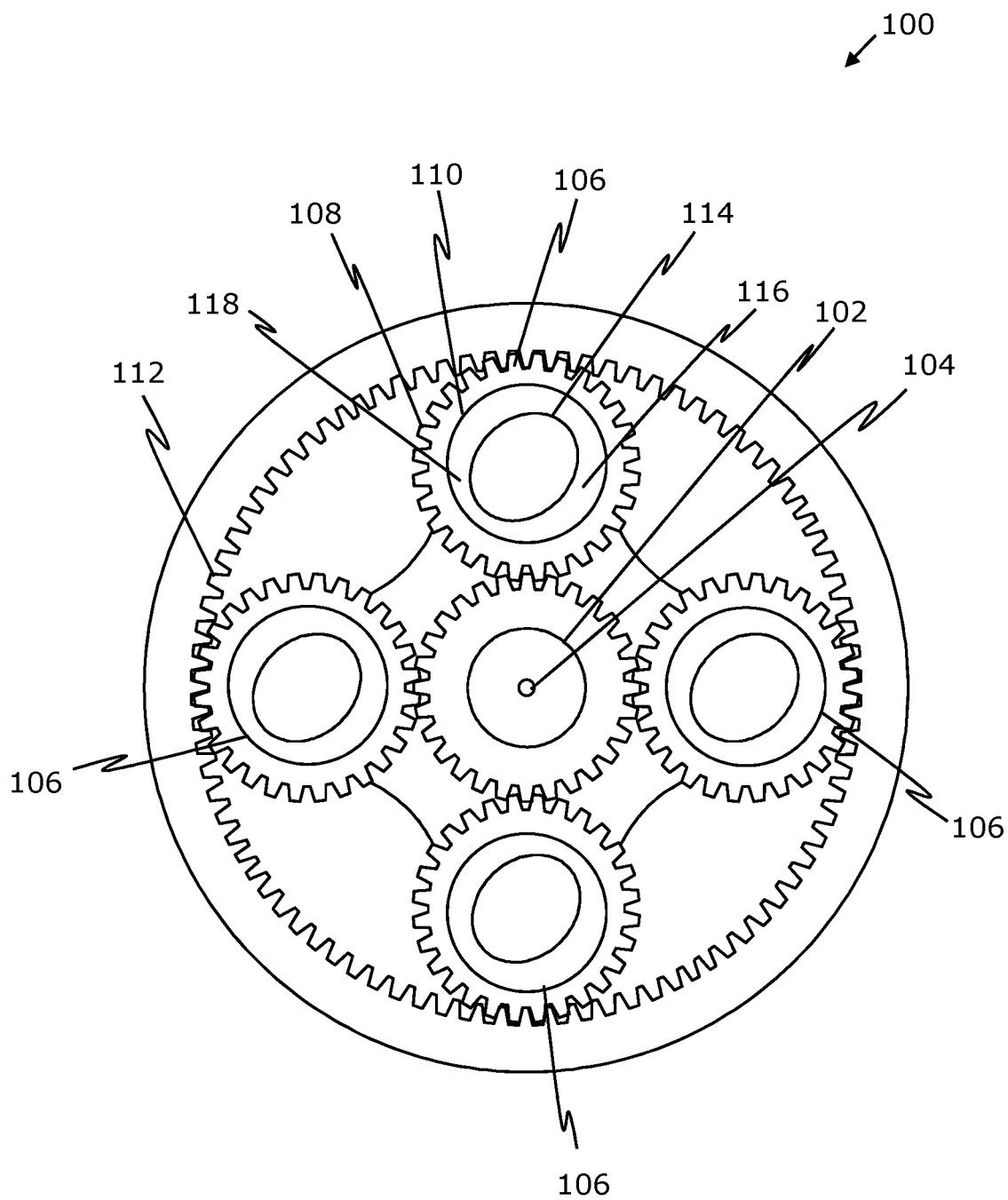
FIG. 1 is a cross-sectional view of a planetary gear arrangement, in accordance with an embodiment of the present disclosure.

As aforementioned, the present disclosure provides an elliptical pin that have a crowning on the outside contact surface. Notably, the crowning compensates for the deformations in an axial direction, whereas the elliptical shape of the elliptical pin compensates for the deformation in circumferential direction. Furthermore, the elliptical pin provides a longer convergent gap between the elliptical pin and gear. Consequently, the loaded area is increased and the journal bearing has a higher load capability. Such a modification increases the structural rigidity in comparison to a conventional cylindrical pin, FIG. 1 is a cross-sectional view of a planetary gear arrangement 100, in accordance with an embodiment of the present disclosure. As shown, the planetary gear arrangement comprises a sun gear 102 configured to rotate about an axis of rotation of the planetary gear arrangement and defines an axial direction of the planetary gear arrangement 100, The sun gear rotates about an axis of rotation 104 that defines an axial direction of the planetary gear arrangement 100.

The planetary gear arrangement 100 further comprises a plurality of planet gears 106. Typically, the sun gear 102 drives the plurality of planet gears 106. It will be appreciated that the toothing of the sun gear 102 is in continuous engagement with the toothing of the plurality of planet gears 106. Optionally, the toothing between the plurality of planet gears 106 and the sun gear 102 may be, for example, a spur gearing, a helical gearing, and a double helical gearing. The plurality of planet gears 106 is configured as a hollow cylinder and forms an outer shell surface 108 and an inner shell surface 110. Notably, the sun gear drives 102 the plurality of planet gears 106 about a rotation axis parallel to the rotation axis of the sun gear 102. The outer shell surface 108 of the plurality of planet gears 106 forms a toothing that is in engagement with the toothing of a ring gear 112. Optionally, the toothing between the plurality of planet gears 106 and the ring gear 112 may be the spur gear, helical gear, double helical gearing. Operatively, the plurality of planet gears 106 rotatably coupled with the sun gear 102 and rotates circumferentially along the ring gear 112.

Moreover, the inner shell surface 110 of the plurality of planet gears 106 has a centered axial opening. Notably, the plurality of planet gears are configured to receive an elliptical pin 114 within each centered axial opening. In this regard, the plurality of elliptical pins 114 and the plurality of planet gears 106 form a lubricated journal bearing at their facing surfaces. Furthermore, the plurality of elliptical pins 114 are arranged in the plurality of planet gears 106 forming a convergent gap 116 and a divergent gap 118 therebetween.

The plurality of elliptical pins 114 are configured to conform to elliptically deformed plurality of planet gears 106 when subjected to a load and form an effective area therebetween to bear the load, and wherein the plurality of elliptical pins include a crowning on the outside contact surface. Notably, the plurality of planet gears 106 and the plurality of elliptical pins 114 have different axis that yields the convergent gap 116 which extends from the maximum gap height to the minimum gap height, and the divergent gap 118 which extends from the minimum gap height to the maximum gap height. Under operation, an oil is drawn into the convergent gap 116 creating a hydrodynamic pressure force to counter-balance the forces imposed to the journal bearing. Due to the law of conservation of mass, there can only be as much oil in the divergent gap 118 as it is able to pass the minimum gap height. Hence, the convergent gap 116 of the journal bearing predominantly contributes to the load re-action by the hydrodynamic oil pressure in it, Typically, the convergent gap 116 is completely filled with the oil and is configured to form a thin oil film. It will be appreciated that the higher external loads will result in higher eccentricity of the journal bearing and thereby having smaller minimum gap height. Notably, the plurality of elliptical pins 114 is designed to increase the convergent gap 116 in circumferential direction.

Optionally, a minimum gap, between the plurality of elliptical pins 114 conforming to the elliptically deformed plurality of planet gears 106 during operation, defines a minimum film thickness. Notably, higher external loads will result in higher eccentricity of the plurality of planet gears 106 and thereby having a smaller minimum film thickness.

The plurality of elliptical pins 114 mimics the anticipated deformation of the plurality of planet gears 106 which is predicted to be an ellipse-like shape in the convergent gap 116. Notably, the plurality of elliptical pins 114 and the plurality of planet gears 106 conform to each other which advantageously improves the hydrodynamic pressure build-up in the convergent gap 116 and hence, the performance of the journal bearing is improved over the minimum film thickness.

Optionally, the plurality of elliptical pins 116 having a major semi-axis and a minor semi-axis ratio in a range of 3 to 4, Notably, a major axis of an ellipse is its longest diameter: a line segment that runs through the center and both foci, with ends at the two most widely separated points of the perimeter. The major semi-axis is the longest semi-diameter or one half of the major axis, and thus runs from the center, through a focus, and to the perimeter. The minor semi-axis of an ellipse is a line segment that is at right angles with the major semi-axis and has one end at the center. The ratio of the major semi-axis and the minor semi-axis is in a range between 3 and 4. The ratio can take values of 3, 3.2, 3.4, 3.6 or 3.8. Alternatively, the ratio can be up to 3.2, 3.4, 3.6, 3.8 or 4 including all intervening values.

Figure 2:
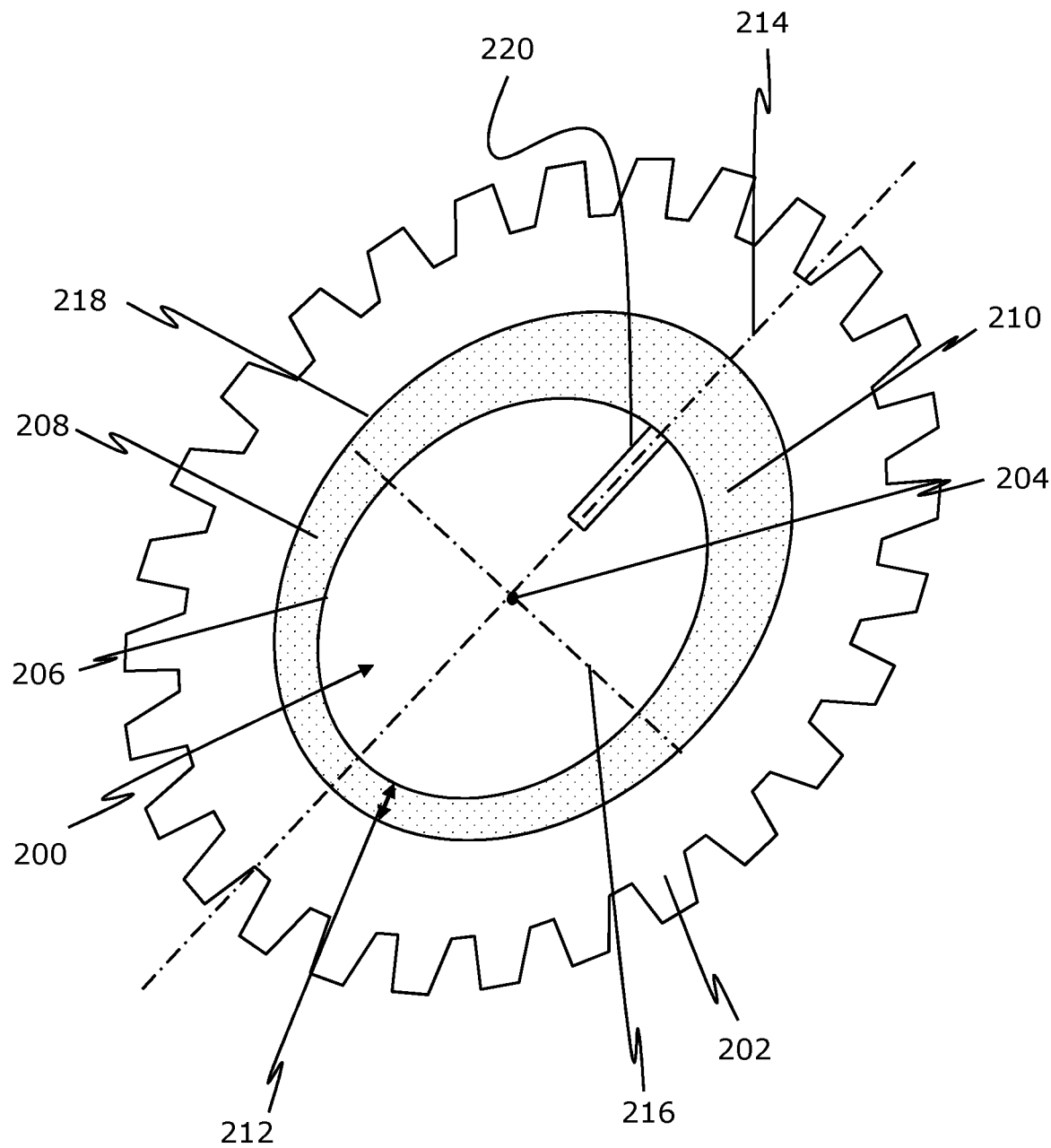
FIG. 2 is a perspective view of an elliptical pin for supporting a gear, in accordance with an embodiment of the present disclosure.

FIG. 2 is a perspective view of an elliptical pin 200 for supporting a gear 202, in accordance with an embodiment of the present disclosure. Gear 202 may be a planet gear of a planetary gear box. As shown in operation, the elliptical pin 200 is surrounded by deformed planet gear 202. The elliptical pin 200 comprises a longitudinal axis 204 and an outside contact surface 206 wherein the elliptical pin 200 is arranged in the planet gear 202 to form a convergent gap 208 and a divergent gap 210 therebetween in clearance region 212 where lubricants such as oil, grease may be used between the outside contact surface 206 of the elliptical pin 200 and an inner surface 218 of the deformed planet gear 202. Moreover, the elliptical pin 200 is configured to conform to elliptically deformed planet gear 202 when subjected to a load and form an effective area therebetween to bear the load.

The elliptical pin 200 may include a crowning on the outside contact surface 206.

The elliptical pin 200 and the planet gear 202 are located eccentric to each other. In this regard, the said eccentricity yields to the convergent gap 208 which extends from a maximum gap height to a minimum gap height, and the divergent gap 210 which extends from minimum gap height to maximum gap height. Under operation, an oil is drawn into the convergent gap 208, Typically, the convergent gap 208 is filled completely with the oil which forms a thin oil film.

The elliptical pin 200 mimics the anticipated deformation of the planet gear 202 in the convergent gap 208. Notably, both the elliptical pin 200 and the planet gear 202 conform to each other which improves the hydrodynamic pressure build up in the convergent gap 208 and thereby improving, the overall performance by an improved minimum gap height. For example, the gap height over an extend length of the elliptical pin is greater than that of the circular pin. Typically, the plurality of elliptical pins having a major semi-axis 214 and a minor semi-axis 216. Notably, the major semi-axis 214 and the minor semi-axis 216 coincides at the center of the elliptical pin 200. In addition, an oil feed 220 coincides with the major semi-axis 214 configured to provide the oil between an inner surface 218 of the planet gear 202 and the outside contact surface 206 of the elliptical pin 200, The planet gear 202 and the elliptical pin 200 conform the elliptical shape in the convergent gap 208 that is configured to balance the gap height on the circumference of the planet gear 202. It will be appreciated that the increase in gap height is given towards the maximum gap height and is reduced towards the minimum gap height. Notably, the oil is normally fed into the gap around the maximum gap height location through the oil feed 220. Moreover, the reduced height results in less oil required to fill up the gap completely.

Figure 3:
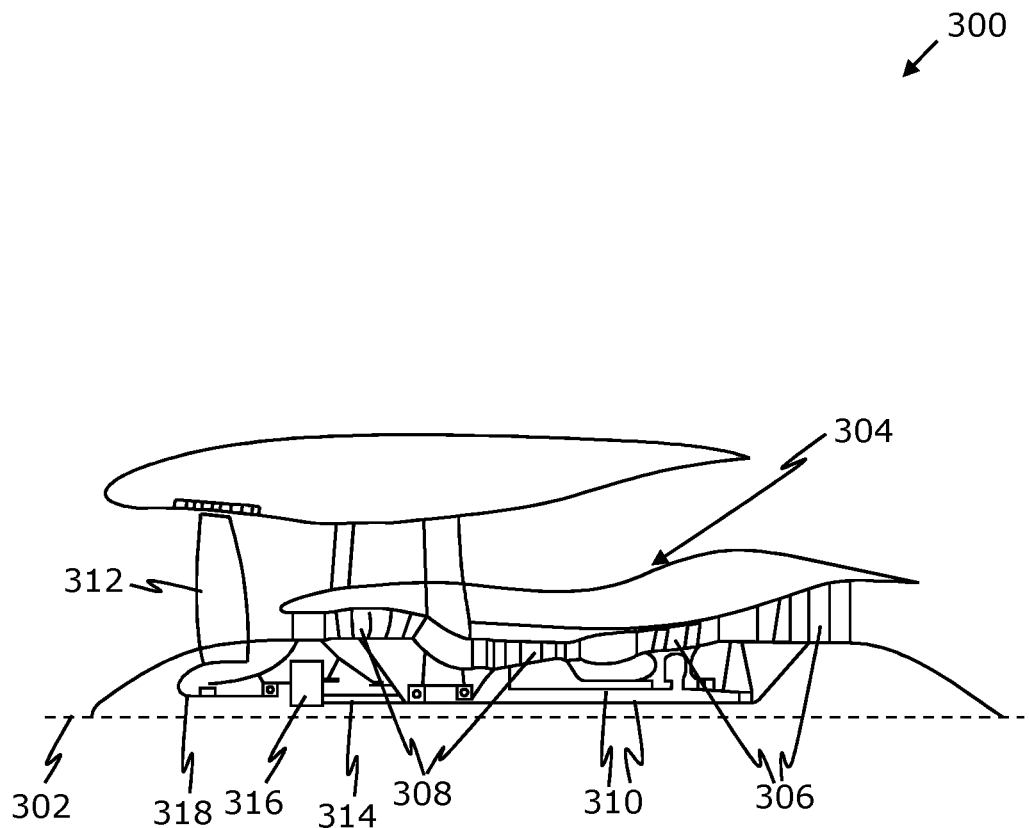
FIG. 3 is a cross-sectional view of a gas turbine engine for an aircraft, in accordance with an embodiment of the present disclosure.

FIG. 3 is a cross-sectional view of a gas turbine engine 300 for an aircraft, in accordance with an embodiment of the present disclosure. As shown the gas turbine engine 300 having a principal axis of rotation 302. The gas turbine engine 300 comprises an engine core 304 having a turbine 306, a compressor 308 and a turbine shaft 310, Notably, the compressor 308 is configured to compress the air and the compressed is then passed to the turbine 306 to expand the compressed gas. Moreover, the gas turbine engine 300 comprises a fan 312 with a plurality of fan blades. The compressor 308 and the turbine 306 may comprise a low pressure section and a high pressure section, respectively, constituting a low pressure compressor, a high pressure compressor, a high pressure turbine and a low pressure turbine.

The turbine shaft 310 connects the turbine 306 to the compressor 308. The fan 312 is positioned upstream of engine core 304, An input shaft 314 connects to a planetary gear arrangement 316 and inputs torque into the planetary gear arrangement. The planetary gear arrangement 316 is arranged upstream of the turbine 306 and the compressor 308 and provides output to the fan shaft 318. During operation air is accelerated and passed into the compressor 308. The compressed aft is ejected from the compressor 308 into a combustion device, where it is mixed with fuel and that mixture is burned. The resulting hot products of combustion spread then through the turbine 306 and drive them before they are used to provide a certain thrust through a nozzle.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A planetary gear arrangement for carrying load comprising:
   a sun gear configured to rotate about an axis of rotation of the planetary gear arrangement and defining an axial direction of the planetary gear arrangement;
   a plurality of planet gears driven by the sun gear;
   a ring gear engaged with the plurality of planet gears; and a plurality of elliptical pins, each having a longitudinal axis and an outside contact surface, wherein the plurality of elliptical pins are arranged in the plurality of planet gears respectively and for each, forming a convergent gap and a divergent gap therebetween, and wherein the plurality of elliptical pins are configured to conform to the plurality of planet gears when elliptically deformed when subjected to a load to form an effective area therebetween to bear the load.

2. The planetary gear arrangement according to claim 1, wherein a minimum gap between the respective plurality of elliptical pins and the plurality of planet gears defines a minimum film thickness.

3. The planetary gear arrangement according to claim 1, wherein the plurality of elliptical pins each has a major semi-axis and a minor semi-axis, wherein a ratio of the major semi-axis to the minor semi-axis is in a range of 3 to 4.

4. The planetary gear arrangement according to claim 3, wherein the ratio of the major semi-axis to the minor semi-axis is 3 or 3.2 or 3.4 or 3.6 or 3.8 or 4 or up to 3, or up to 3.2 or up to 3.4 or up to 3.6 or up to 3.8 or up to 4.

5. The planetary gear arrangement according to claim 1, wherein each of the plurality of elliptical pins includes a crowning on the outside contact surface.

6. The planetary gear arrangement according to claim 3, wherein each of the elliptical pins comprises an oil feed, wherein the oil feed coincides with the major semi-axis.

7. An elliptical pin for supporting a gear, the elliptical pin comprising:
    a longitudinal axis and
    an outside contact surface,
wherein the elliptical pin when arranged in the gear forms a convergent gap and a divergent gap therebetween, and wherein the elliptical pin is configured to conform to the gear when elliptically deformed when subjected to a load to form an effective area therebetween to bear the load.

8. The elliptical pin according to claim 7, wherein the elliptical pin includes a crowning on the outside contact surface.

9. The elliptical pin according to claim 7, wherein the elliptical pin comprises an oil feed.

10. The elliptical pin according to claim 9, wherein the elliptical pin is defined by a major semi-axis and a minor semi-axis, wherein the oil feed coincides with the major semi-axis.

11. The elliptical pin according to claim 7, wherein the elliptical pin has a major semi-axis and a minor semi-axis, wherein a ratio of the major semi-axis to the minor semi-axis is in a range of 3 to 4.

12. The elliptical pin according to claim 11, wherein the ratio of the major semi-axis to the minor semi-axis is 3 or 3.2 or 3.4 or 3.6 or 3.8 or 4 or up to 3, or up to 3.2 or up to 3.4 or up to 3.6 or up to 3.8 or up to 4.

13. A gas turbine engine for an aircraft, comprising:
    an engine core having a turbine, a compressor and a turbine shaft connecting the turbine to the compressor;
    a fan positioned upstream of the engine core, the fan having a plurality of fan blades,
    an input shaft; and
    a planetary gear arrangement comprising the elliptical pin according to claim 7, for receiving input from the input shaft and providing output to the fan shaft.

\* \* \* \* \*